United States Patent
Chen et al.

(10) Patent No.: US 10,443,515 B2
(45) Date of Patent: Oct. 15, 2019

(54) INTERNAL COMBUSTION ENGINE FEATURING PARTIAL SHUTDOWN AND METHOD FOR OPERATING AN INTERNAL COMBUSTION ENGINE OF THIS KIND

(71) Applicant: Ford Global Technologies, LLC, Dearborn, MI (US)

(72) Inventors: Guohui Chen, Aachen (DE); Werner Willems, Aachen (DE); Leonhard Bartsch, Aachen (DE); Helmut Hans Ruhland, Eschweiler (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1015 days.

(21) Appl. No.: 13/904,453

(22) Filed: May 29, 2013

(65) Prior Publication Data

US 2013/0333663 A1    Dec. 19, 2013

(30) Foreign Application Priority Data

Jun. 13, 2012    (DE) .................. 10 2012 209 912

(51) Int. Cl.
  *F02D 17/02*  (2006.01)
  *F02D 13/06*  (2006.01)
  *F02D 41/12*  (2006.01)

(52) U.S. Cl.
  CPC .......... *F02D 17/02* (2013.01); *F02D 13/06* (2013.01); *F02D 17/023* (2013.01); *F02D 41/123* (2013.01)

(58) Field of Classification Search
  CPC ........ F02D 17/02; F02D 13/06; F02D 17/023; F02D 41/123

USPC .................... 123/334, 481, 339.23
See application file for complete search history.

(56) References Cited

U.S. PATENT DOCUMENTS

| | | | | |
|---|---|---|---|---|
| 4,304,208 A | * | 12/1981 | Etoh | F02D 17/02 123/198 F |
| 6,874,463 B1 | * | 4/2005 | Bolander | F02D 11/105 123/198 F |
| 6,941,905 B2 | * | 9/2005 | Hitomi | F02D 9/04 123/568.11 |
| 7,497,198 B2 | * | 3/2009 | Leone | B60K 6/365 123/295 |
| 7,621,126 B2 | * | 11/2009 | Kolmanovsky | F01L 9/04 60/600 |
| 7,650,218 B2 | * | 1/2010 | Andreae | F02B 37/002 60/605.1 |

(Continued)

FOREIGN PATENT DOCUMENTS

| | | |
|---|---|---|
| DE | 19606584 A1 | 10/1996 |
| DE | 19606585 A1 | 10/1996 |

(Continued)

*Primary Examiner* — David Hamaoui
(74) *Attorney, Agent, or Firm* — Geoffrey Brumbaugh; McCoy Russell LLP (57) ABSTRACT

Systems and methods are provided for an engine wherein one group of cylinders is active and a second group of cylinders is switchable, such that under low loads the second group of cylinders is deactivated, and under high loads the second group of cylinders is activated. Following deactivation of the second group of cylinders a throttling element in an intake line for the second group of cylinders is gradually closed. The closing of the throttling element may reduce pumping losses and thus increase engine efficiency.

14 Claims, 3 Drawing Sheets

(56) References Cited

U.S. PATENT DOCUMENTS

| | | | | |
|---|---|---|---|---|
| 7,917,282 B2* | 3/2011 | Turner | ................... | F01L 1/143 |
| | | | | 123/568.21 |
| 8,256,214 B2* | 9/2012 | Rioli | ...................... | F02D 17/02 |
| | | | | 123/90.15 |
| 8,418,680 B2* | 4/2013 | Zitzler | ............... | F02B 29/0412 |
| | | | | 123/481 |
| 8,631,646 B2* | 1/2014 | Smith | .................. | F01N 3/0842 |
| | | | | 123/198 F |
| 8,919,097 B2* | 12/2014 | Kerns | ................ | F02D 41/0087 |
| | | | | 123/198 F |
| 8,991,178 B2* | 3/2015 | Schlund | ................ | F02M 25/07 |
| | | | | 123/198 F |
| 9,010,300 B2* | 4/2015 | Orban | .................. | F02D 17/026 |
| | | | | 123/198 F |
| 9,151,216 B2* | 10/2015 | Banker | ................ | F01N 3/0814 |
| 9,587,589 B2* | 3/2017 | Kemmerling | ....... | F02D 41/0087 |
| 2007/0234984 A1* | 10/2007 | Kolmanovsky | ........... | F01L 9/04 |
| | | | | 123/90.15 |
| 2008/0029058 A1* | 2/2008 | Duesmann | ................ | F02D 9/00 |
| | | | | 123/198 F |
| 2009/0107456 A1* | 4/2009 | Pallett | ..................... | F02D 37/02 |
| | | | | 123/299 |
| 2011/0011083 A1* | 1/2011 | Eckart | .................... | F02D 23/00 |
| | | | | 60/602 |
| 2012/0055444 A1* | 3/2012 | Tobergte | ................. | F02D 13/06 |
| | | | | 123/294 |
| 2013/0333663 A1* | 12/2013 | Chen | ....................... | F02D 17/02 |
| | | | | 123/334 |
| 2014/0331667 A1* | 11/2014 | Kindl | ..................... | F02M 26/43 |
| | | | | 60/602 |
| 2015/0322897 A1* | 11/2015 | Sommerhoff | ......... | F02B 37/001 |
| | | | | 123/568.11 |
| 2016/0108822 A1* | 4/2016 | Kim | ......................... | F02D 9/08 |
| | | | | 123/332 |
| 2016/0195031 A1* | 7/2016 | Willems | ............... | F02D 41/0087 |
| | | | | 123/52.1 |
| 2016/0312721 A1* | 10/2016 | De Smet | ................ | F02M 26/05 |
| 2017/0030279 A1* | 2/2017 | Bartsch | ............... | F02D 41/0087 |

FOREIGN PATENT DOCUMENTS

| | | |
|---|---|---|
| DE | 19731129 A1 | 1/1999 |
| DE | 102005004728 A1 | 8/2006 |
| DE | 102009060211 A1 | 6/2011 |

\* cited by examiner

INTERNAL COMBUSTION ENGINE FEATURING PARTIAL SHUTDOWN AND METHOD FOR OPERATING AN INTERNAL COMBUSTION ENGINE OF THIS KIND

CROSS REFERENCE TO RELATED APPLICATIONS

The present application claims priority to German Patent Application No. 102012209912.3, filed on Jun. 13, 2012, the entire contents of which are hereby incorporated by reference for all purposes.

TECHNICAL FIELD

The present application relates to cylinder deactivation in internal combustion engines.

BACKGROUND AND SUMMARY

It is a fundamental aim in developing internal combustion engines to minimize fuel consumption, with increased overall efficiency being at the forefront of the efforts made. Fuel consumption, and hence efficiency, is problematic, especially in the case of spark-ignition engines, e.g. in the case of internal combustion engines with applied ignition. The reason lies in the fundamental operating method of the spark-ignition engine. Load control is generally performed by a throttle valve provided in the intake system. By adjusting the throttle valve, the pressure of the induced air behind the throttle valve can be reduced to a greater or lesser extent. The further the throttle valve is closed, e.g. the more it blocks the intake system, the greater is the pressure loss in the induced air across the throttle valve and the lower is the pressure of the induced air downstream of the throttle valve and ahead of the inlet to the at least two cylinders, e.g. combustion chambers. Given a constant combustion chamber volume, the air mass, e.g. quantity, can be adjusted by the pressure of the induced air. This also explains why quantity control proves disadvantageous precisely in part-load operation, since low loads use a high degree of throttling and pressure reduction in the intake system, thereby causing a rise in exhaust and refill losses with decreasing load and increasing throttling.

Another possibility for optimizing the combustion process in a spark-ignition engine is to use an at least partially variable valve gear. In contrast to conventional valve gears, in which both the stroke of the valves and the timings are invariable, these parameters that influence the combustion process and hence fuel consumption can be varied to a greater or lesser extent by variable valve gears. Throttle-free and hence loss-free load control is possible merely through the possibility of varying the closing time of the inlet valve and the inlet valve stroke. The mass of mixture flowing into the combustion chamber during the intake process is then controlled not by a throttle valve but by way of the inlet valve stroke and the opening duration of the inlet valve. However, variable valve gears are very expensive and are therefore often unsuitable for use in production vehicles.

Another possible solution for dethrottling a spark-ignition engine is offered by cylinder shutdown, e.g. the switching off of individual cylinders in certain load ranges. The efficiency of spark-ignition engines in part-load operation may be increased, by partial shutdown, since switching off a cylinder of a multi-cylinder internal combustion engine increases the loading of the other cylinders that are still in operation, given a constant engine output, and therefore the throttle valve may be opened further to introduce a larger air mass into said cylinders, the overall result being dethrottling of the internal combustion engine. During partial shutdown, the cylinders that are continuously in operation operate in the range of higher loads, at which specific fuel consumption is lower. The load population is shifted toward higher loads. The cylinders that continue to be operated during partial shutdown furthermore have increased mixture formation and tolerate higher exhaust gas recirculation rates by virtue of the larger air mass or mass of mixture supplied.

The cylinders that continue to be operated during partial shutdown furthermore tolerate higher exhaust gas recirculation rates by virtue of the larger fuel mass supplied, e.g. by virtue of the richer mixture. As regards wall heat losses, the same advantages are obtained as with spark-ignition engines, and therefore attention is drawn to the corresponding explanations.

Partial shutdown in the case of diesel engines is also intended to prevent the fuel/air mixture from becoming too lean in the course of quality control as the load decreases, due to a reduction in the fuel quantity employed.

However, the multi-cylinder internal combustion engines featuring partial shutdown which are known, and the associated methods for operating said internal combustion engines, have significant potential for improvement, as will be explained briefly below, using a diesel engine by way of example. If the fuel supply to the cylinders that can be switched off is suppressed, e.g. shut down, for the purpose of partial shutdown in the case of a direct heat-injection diesel engine, the cylinders that have been switched off continue to take part in the exhaust and refill process if the associated valve gear of said cylinders is not deactivated or cannot be deactivated. The exhaust and refill losses generated in this case reduce the improvements as regards fuel consumption and efficiency which are achieved by partial shutdown and counteract said improvements, with the result that the benefit of partial shutdown is at least partially lost, that is to say that, overall, partial shutdown actually involves a less significant improvement.

In practice, it is not expedient to remedy the disadvantageous effects described above by providing switchable valve gears since switchable valve gears, like variable valve gears, are very expensive. Moreover, switchable valve gears would lead to further problems in the case of internal combustion engines pressure-charged by exhaust turbocharging since the turbine of an exhaust turbocharger has to be designed for a particular exhaust gas quantity and hence also for a particular number of cylinders. If the valve gear of a cylinder that has been switched off is deactivated, the total mass flow through the cylinders of the internal combustion engine decreases owing to the lack of mass flow through the cylinders which have been switched off. The exhaust gas mass flow passed through the turbine decreases and, with it, the turbine pressure ratio. The result is that the boost pressure ratio likewise decreases, e.g. the boost pressure falls, and a small amount of fresh air or charge air is fed or can be fed to the cylinders which continue in operation. The low charge air flow can also lead to the compressor operating beyond the pulsation limit.

The effects described above lead to a restriction in the application of partial shutdown, namely to a restriction of the load range in which partial shutdown can be employed. The reduced charge air quantity which is fed to the cylinders that are in operation during partial shutdown reduces the effectiveness or quality of combustion and has a disadvantageous effect on fuel consumption and pollutant emissions.

The boost pressure in the case of partial shutdown and hence the charge air quantity fed to the cylinders that continue in operation could be increased, for example, by a small turbine cross section design and simultaneous exhaust gas blowoff, which would also expand the load range relevant to partial shutdown again. However, this procedure has the disadvantage that the pressure-charging behavior is inadequate when all the cylinders are operated.

The boost pressure in the case of partial shutdown and hence the charge air quantity fed to the cylinders which continue in operation could also be increased by providing the turbine with variable turbine geometry, which allows adaptation of the effective turbine cross section to the instantaneous exhaust gas mass flow. In that case, however, the exhaust back pressure in the exhaust system upstream of the turbine would simultaneously increase, leading in turn to higher exhaust and refill losses in the cylinders that continue in operation.

The inventors herein recognize the above mentioned disadvantages and disclose an internal combustion engine with greater efficiency. In the case of the internal combustion engine according to the disclosure, the charge air supply to the cylinders that have been switched off, e.g. the charge air quantity supplied during partial shutdown, can be reduced and controlled, or even cut off if appropriate, without fitting the switchable cylinders with switchable valve gears, which give rise to high costs. For this purpose, a throttling element is provided in the intake line of each cylinder which can be switched as a function of load. The flow cross section of the intake line can be varied, in particular reduced, by actuating said throttling element, thereby enabling the charge air quantity fed to the at least one cylinder that has been switched off during partial shutdown to be adjusted, metered and controlled.

The charge air supply can be reduced by a throttling element. According to the disclosure, less charge air or no charge air is supplied, in order to reduce the exhaust and refill losses of the cylinders that have been switched off. In comparison with an unchanged charge air flow with the intake line fully open, the reduced charge air flow through the at least one cylinder that has been switched off leads to reduced heat transfer due to convection, with the result that the cylinders that have been switched off cool to a lesser extent or not at all during partial shutdown. This has advantages particularly as regards pollutant emissions, particularly as regards emissions of unburned hydrocarbons, since the cylinders that have been switched off re-attain or once again have the operating temperature thereof immediately after the ending of partial shutdown.

Systems and methods are provided herein for an engine wherein one group of cylinders is active and a second group of cylinders is switchable, such that under low loads the second group of cylinders is deactivated, and under high loads the second group of cylinders is activated. Following deactivation of the second group of cylinders a throttling element in an intake line for the second group of cylinders is gradually closed. The closing of the throttling element may reduce pumping losses and thus increase engine efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

Figure 1:
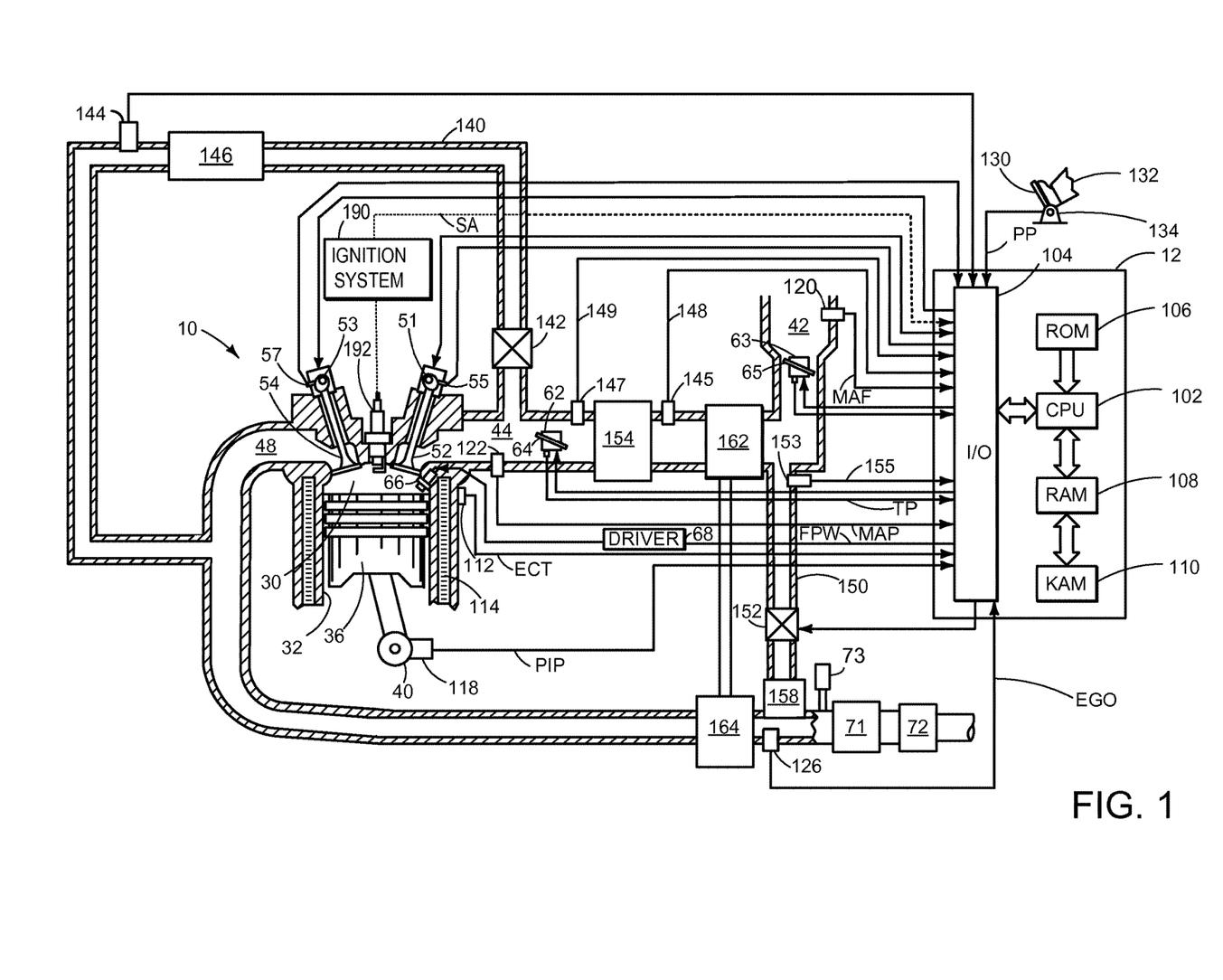
FIG. 1 shows an example cylinder of an engine in accordance with the present disclosure.

Referring now to FIG. 1, a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. Combustion chamber 30 or one or more other combustion chambers of engine 10 may be operated in a compression ignition mode, with or without an ignition spark.

Embodiments of the internal combustion engine in which each cylinder is fitted with a direct injection system for introducing fuel may be advantageous.

In this case, embodiments in which each cylinder is fitted with an injection nozzle for the purpose of direct injection may be advantageous.

For the purpose of partial shutdown, the fuel supply can be deactivated more quickly and more reliably in the case of direct-injection internal combustion engines than in the case of internal combustion engines with intake manifold injection, in which fuel residues in the intake manifold can lead to unwanted combustion in the cylinder that has been switched off.

Nonetheless, embodiments of the internal combustion engine in which intake manifold injection is provided for the purpose of fuel supply can be advantageous.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The throttling elements may, in an alternative embodiment, be continuously variable, and may further comprise a pivotable flap or valve. Throttling element 62 may be in an intake line specific to a single cylinder, for example the inner two cylinders of a four cylinder in-line engine. In the particular example of a four cylinder in-line engine throttling element 62 may or may not be present in the outer cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Embodiments of the internal combustion engine in which the throttling element is a valve may be advantageous.

Embodiments of the internal combustion engine in which the throttling element is a pivotable flap may be advantageous.

Embodiments of the internal combustion engine in which the throttling element is continuously variable may be advantageous. Embodying the throttling element as a continuously variable throttling element allows precise metering of the charge air quantity introduced into the cylinders that have been switched off. The charge air quantity can be chosen specifically for the operating point, in particular with a view to minimum exhaust and refill losses and/or a required boost pressure. The control of the throttling element can take account of the load T, the engine speed n, the coolant temperature in the case of a liquid-cooled internal combustion engine, or the oil temperature, as examples.

Nonetheless, embodiments of the internal combustion engine in which the throttling element can be switched in two stages or multiple stages can also be advantageous.

The throttling element can be suitable for electric, hydraulic, pneumatic, mechanical or magnetic control, preferably by an engine controller.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Advantages may be obtained in the case of internal combustion engines pressure-charged by exhaust turbocharging. The higher mass flow leads to a higher turbine pressure ratio and hence to a higher boost pressure, with the result that a larger charge air quantity can be made available to the cylinders that are in operation during partial shutdown. This also expands the range of application of partial shutdown, namely the load range in which partial shutdown can be employed, and improves the quality of combustion and hence the consumption and emissions behavior of the internal combustion engine.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, diesel oxidation catalyst, diesel particular filter or combinations thereof. For example, device 71 may be a diesel oxidation catalyst and device 72 may be a diesel particulate filter (DPF) (also referred to herein as a soot filter). A urea injector 73 may be arranged upstream of the emission control devices and introduces urea (e.g. diesel exhaust fluid/DEF) into the exhaust passage as a reducing agent during regeneration of catalysts. In some embodiments, DPF 72 may be located downstream of diesel oxidation catalyst 71 (as shown in FIG. 1), while in other embodiments, DPF 72 may be positioned upstream of diesel oxidation catalyst (not shown in FIG. 1).

Embodiments of the internal combustion engine in which at least one exhaust gas aftertreatment system is provided in the exhaust system may be advantageous; e.g. an oxidation catalyst, a three-way catalyst, a storage catalyst, and a selective catalyst and/or a particulate filter.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows one cylinder of a multi-cylinder engine, and that each cylinder may similarly include its own set of intake/exhaust valves, fuel injector, spark plug, etc.

Figure 2:
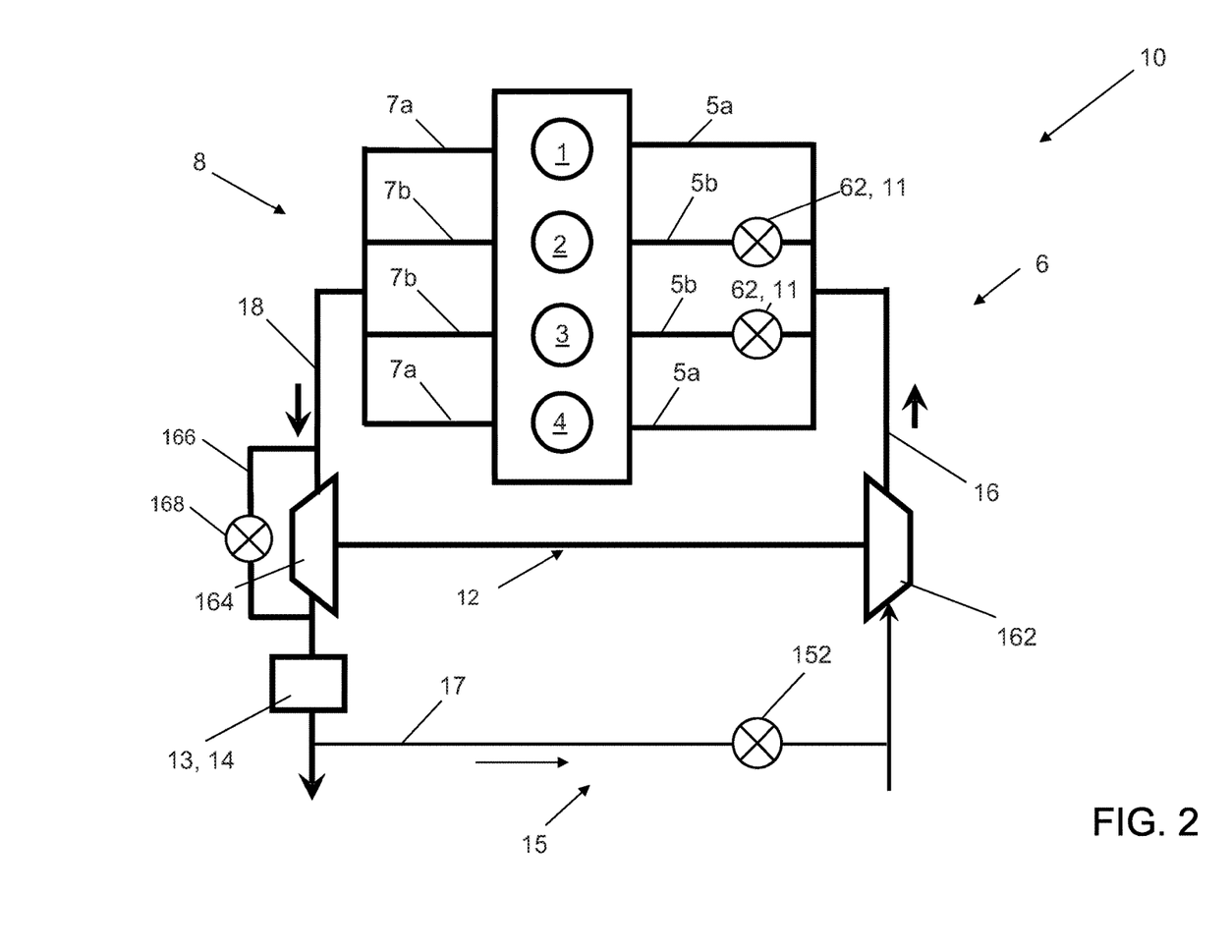
FIG. 2 shows schematically a first embodiment of an auto-ignition internal combustion engine.

Turning now to FIG. 2, a four-cylinder in-line engine 10 is shown. The engine 10 comprises direct injection, in which the four cylinders 1, 2, 3, 4 are arranged along the longitudinal axis of the cylinder head, e.g. in line, and are each fitted with an injector (shown at 66 in FIG. 1) for injecting fuel, wherein the injected fuel quantity is used to adjust the air ratio $\lambda$. The cylinder 30 of FIG. 1 may be an example a single cylinder of a four cylinder in-line engine such as shown in FIG. 2.

Each cylinder 1, 2, 3, 4 has an intake line 5a, 5b for taking in charge air via an intake system 6 and an exhaust line 7a, 7b for discharging the exhaust gases via an exhaust system 8.

For the purpose of pressure charging, the internal combustion engine 10 is fitted with an exhaust turbocharger 12, the turbine 164 being arranged in a common exhaust line 18 of the exhaust system 8, and the compressor 162 being arranged in a common intake line 16 of the intake system 6. The fresh air fed to the internal combustion engine 10 is compressed in the compressor 162, for which purpose the enthalpy of the exhaust gas flow in the turbine 164 is used. For aftertreatment of the exhaust gas, a particulate filter 14 used as an exhaust gas aftertreatment system 13 is provided in the common exhaust line 18 downstream of the turbine 164. Furthermore, the turbine 164 may be bypassed by the wastegate 166 equipped with a wastegate valve 168. Wastegate valve 168 may be adjusted to control air flow through wastegate 166 in response to turbine speed, air pressure, or exhaust temperature or oxygen content.

Embodiments of the internal combustion engine in which at least one exhaust turbocharger is provided, which comprises a turbine arranged in the exhaust system and a compressor arranged in the intake system, may be advantageous. The advantage of the exhaust turbocharger in comparison with a mechanical charger, for example, is that there may be no mechanical link for power transmission between the charger and the internal combustion engine. Whereas a mechanical charger draws all the energy required to drive it from the internal combustion engine and thus reduces the power made available, and in this way has a disadvantageous effect on efficiency, the exhaust gas turbocharger uses the exhaust energy of the hot exhaust gases.

Pressure-charged internal combustion engines are preferably fitted with a charge air cooling system, by which the compressed combustion air is cooled before entering the cylinders. This further increases the density of the charge air supplied. In this way, cooling likewise contributes to compression and filling of the combustion chambers, e.g. to greater volumetric efficiency. It may be advantageous to fit the charge air cooler with a bypass line in order to be able to bypass the charge air cooler when required, e.g. after a cold start.

Pressure-charging is a suitable way of boosting the output of an internal combustion engine while leaving the displacement unchanged, or of reducing the displacement for the same output. In either case, pressure-charging leads to an increase in power per unit volume and a more favorable power-to-mass ratio. Given identical vehicle boundary conditions, the load population can thus be shifted toward high loads, at which specific fuel consumption is lower.

The design of the exhaust turbocharging system involves some difficulties, the fundamental aim being to achieve a noticeable increase in power in all engine speed ranges. According to known methods, a sharp drop in torque is often observed when a certain engine speed is undershot. The torque characteristic of a pressure-charged internal combustion engine can be increased by various measures, e.g. by providing a plurality of chargers—exhaust turbochargers and/or mechanical chargers—arranged in parallel and/or in series in the exhaust system.

In the case of internal combustion engines with four cylinders arranged in series, embodiments which are distinguished by the fact that the two outer cylinders and the two inner cylinders form respective groups may be advantageous.

The internal combustion engine 10 is furthermore fitted with an exhaust gas recirculation system 15, namely with a low-pressure EGR system. For this purpose, a recirculation line 17 branches off from the exhaust system 8 downstream of the particulate filter 14 and opens into the intake system 6 upstream of the compressor 162. A valve 19 for adjusting the recirculated exhaust gas quantity is arranged in the recirculation line 17 of the exhaust gas recirculation system 15.

Embodiments of the internal combustion engine in which at least one exhaust gas recirculation system is provided, which comprises a recirculation line that branches off from the exhaust system and opens into the intake system, may be advantageous.

Exhaust gas recirculation, e.g. the recirculation of combustion gases, is a suitable way of reducing nitrogen oxide emissions, it being possible to significantly reduce nitrogen oxide emissions as the exhaust gas recirculation rate increases. The exhaust gas recirculation rate $x_{AGR}$ is determined by $x_{AGR}=m_{AGR}/(m_{AGR}+m_{Frischluft})$, where $m_{AGR}$ is the mass of exhaust gas recirculated and $m_{Frischluft}$ is the fresh air supplied and, if required, passed through a compressor and compressed. In order to achieve a significant reduction in nitrogen oxide emissions, high exhaust gas recirculation rates are required, rates of the order of $x_{AGR}\approx 60\%$ to 70% being possible.

Embodiments of the internal combustion engine in which a valve for adjusting the recirculated exhaust gas quantity is arranged in the recirculation line of the exhaust gas recirculation system may be advantageous.

In the case of internal combustion engines having at least one exhaust turbocharger and one exhaust gas recirculation system, embodiments in which the recirculation line of the exhaust gas recirculation system branches off from the exhaust system downstream of the turbine of the at least one exhaust turbocharger and opens into the intake system upstream of the compressor may be advantageous. In this "high-pressure EGR system", the exhaust gas is removed from the exhaust system upstream of the turbine and fed into the intake system downstream of the compressor, for which reason the exhaust gas does not have to be subjected to any exhaust gas aftertreatment before recirculation, in particular does not have to be supplied to a particulate filter, since there is no risk that the compressor will be contaminated.

However, when an internal combustion engine is operated with exhaust gas turbocharging and simultaneous use of a high-pressure EGR system, there may be a conflict since the recirculated exhaust gas is no longer available to drive the turbine. When the exhaust gas recirculation rate is increased, the exhaust gas flow introduced into the turbine decreases. The reduced exhaust gas mass flow through the turbine entails a lower turbine pressure ratio, thereby likewise resulting in a decrease in the boost pressure ratio, this being equivalent to a smaller charge air flow.

"Low-pressure EGR" offers one solution to this. In contrast to high-pressure EGR, in low-pressure EGR exhaust gas which has already flowed through the turbine is introduced into the intake system. For this purpose, the low-pressure EGR system has a recirculation line which branches off from the exhaust system downstream of the turbine and opens into the intake system upstream of the compressor.

The exhaust gas recirculated to the inlet side by low-pressure EGR is mixed with fresh air upstream of the compressor. The mixture of fresh air and recirculated exhaust gas produced in this way forms the charge air which is fed to the compressor and compressed.

Since, in the context of low-pressure EGR, exhaust gas is passed through the compressor, it may be subjected in advance to an exhaust gas aftertreatment, in particular in the particulate filter. Deposits in the compressor that alter the geometry of the compressor, in particular the flow cross sections may impair the efficiency of the compressor.

For the reasons mentioned above, embodiments of the internal combustion engine in which the recirculation line of the exhaust gas recirculation system branches off from the exhaust system downstream of the turbine of the at least one exhaust turbocharger and opens into the intake system upstream of the compressor may be advantageous. However, an engine in accordance with the present disclosure may further be equipped with an H-P EGR system in addition, as shown in FIG. 1.

Turning again to FIG. 2, the four cylinders 1, 2, 3, 4 are configured to form two groups, each comprising two cylinders wherein the two outer cylinders 1, 4 form a first group. The first group of cylinders 1, 4 operates even when the internal combustion engine 10 is partially shutdown. The two inner cylinders 2, 3 form a second group, the cylinders of which are designed as cylinders that can be switched as a function of load and which are switched off in the context of partial shutdown.

Valves 11 used as throttling elements 62 are provided in the intake lines 5b of the two inner cylinders 2, 3, by which valves the charge air quantity fed to the cylinders 2, 3 that are switched off is adjusted by varying the size of the flow cross section of the intake line 5b.

In the present case, the cylinders 2, 3 of the second group are designed as cylinders 2, 3 which can be switched on and which are switched off in part-load operation when a predeterminable load is undershot, namely by reducing the flow cross section of the intake lines 5b thereof by throttling element 62 and deactivating fuel injection. As a result, there is an increase in the load demand on the cylinders 1, 4 of the first group, which continue in operation and which are then operated at higher loads with a lower specific fuel consumption. This results in an improvement in efficiency.

The internal combustion engine according to the disclosure has at least two cylinders or at least two groups, each comprising at least one cylinder. Though FIG. 2 shows the specific example of a four cylinder engine it is possible for an engine having three cylinders, which are configured in three groups, each comprising one cylinder, or internal combustion engines having six cylinders, which are configured in three groups, each comprising two cylinders, to be in accordance with the disclosure. In the context of a partial shutdown, the three cylinder groups can be switched on and switched off successively, thereby also making it possible to achieve two-time switching. Partial shutdown is thereby optimized further. The cylinder groups may also comprise a different number of cylinders.

Figure 3:
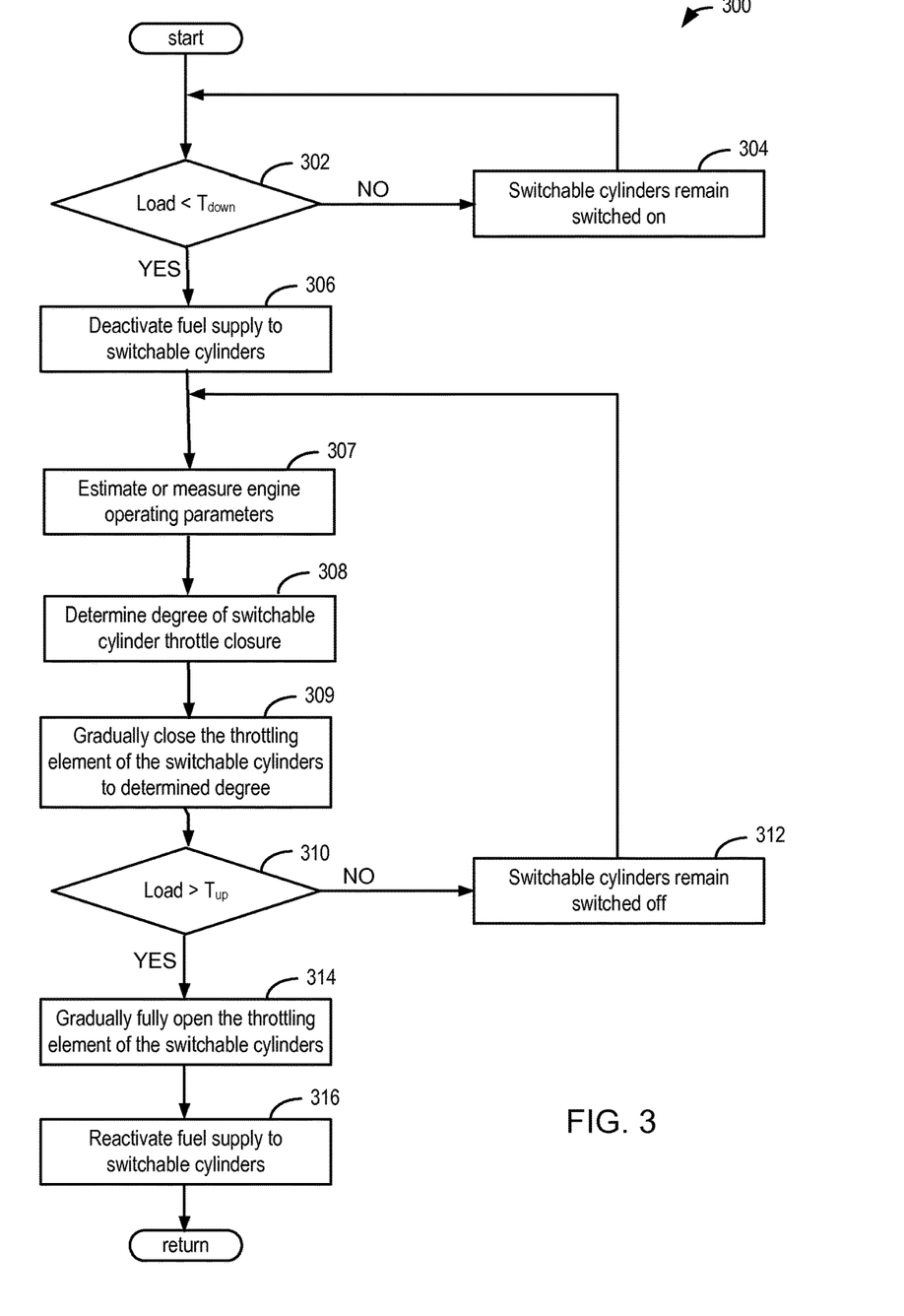
FIG. 3 shows a flow chart of a method in accordance with the present disclosure.

Turning now to FIG. 3, a method 300 is shown for operating an internal combustion engine in accordance with the present disclosure. The method may be carried out by engine controller 12 and stored in read-only memory 106. The method starts and proceeds to 302 where it is determined if the load is less than a first predetermined threshold $T_{down}$. If not (NO), the method proceeds to 304 where the switchable (second group) cylinder remains switched on.

If the engine load is less than the first predetermined threshold $T_{down}$ (YES) the method proceeds to 306 where the fuel supply to the switchable cylinders is deactivated to switch the cylinders off.

After, or concurrently with fuel deactivation to the switchable cylinders (2 and 3 in FIG. 2) engine operating parameters are estimated or measured at 307. This may include measurements from MAP, UEGO, hall effect and other sensors described above in reference to FIG. 1. Engine operating parameters including engine load, speed, air-fuel ratio, exhaust temperature, manifold absolute pressure and oxygen content may be of particular relevance as the method proceeds to 308 where a degree of throttle closure is determined. The throttles 62 of the switchable cylinders 2 and 3 may be closed to a determined degree to reduce pumping losses during cylinder shut off. A further benefit of throttle closure in the switchable cylinders is to control the exhaust flow to a turbocharger turbine 164 to maintain desired flow and pressure ratios across the turbine and compressor. Such operation can be particularly advantages as compared to cylinder valve deactivation as an adjustable amount of exhaust flow is still available, while controlling engine torque with the still active cylinders having different cylinder air amounts than the deactivated cylinders.

The throttling elements 62 may, for example, be further closed as engine load increases and sufficient exhaust flow is provided to turbocharger turbine 164 to maintain an effective pressure and speed. In one example, the degree of throttling of only cylinders 2 and 3 may be adjusted responsive to exhaust pressure and turbine speed, for example, while also adjusting the turbocharger wastegate to maintain a desired boost level. Furthermore, an oxygen content of exhaust gases may be monitored so that exhaust gas aftertreatment devices 71 and 72 may effectively reduce or store $NO_x$ or other emissions. High exhaust gas oxygen content may decrease the ability of exhaust aftertreatment to reduce NOx. Rich exhaust gas may be controlled by further closing of the throttling elements as oxygen entering the shut off cylinders is not combusted and goes directly into the exhaust discharge system. The degree of throttling may further be dependent on a desired boost pressure. Additionally, the degree of throttling of the switchable cylinders may be coordinated with waste gate 166 such that, for example, when switchable cylinders are shut off the waste gate 166 may be substantially closed such that air quantity and pressure may be controlled by throttles 162. In one example, while the inner cylinders are switched-off, the waste gate is adjusted responsive the degree of throttle closure. Note that the degree of throttle closure may vary between fully closed, and fully open.

At 309, the throttling element located in the intake line of the switchable cylinder (s) is gradually closed to the predetermined degree from 308. Gradual closure of the throttling element may prevent rapid changes to exhaust flow which may result in pressure differentials in a turbocharger, changes to EGR composition or aircharge pressure.

At 310, it is determined if the load is greater than a second predetermined threshold $T_{up}$. If the load is not greater than $T_{up}$ (NO) the engine continues to operate with the switchable cylinders shut off at 312. From 312, the method proceeds to above 307 where engine operating parameters are again measured. In this way, while the switchable cylinders remain shut off, continuous adjustments to the degree of closure for throttles 62 may be made.

If the load is greater than $T_{up}$ (YES), the method proceeds to 314 where the throttling element gradually fully opens. At 316, the fuel supply of the switchable cylinders is reactivated.

The embodiment of the internal combustion engine according to the disclosure optimizes the efficiency of the internal combustion engine in part-load operation, e.g. at low loads, a low load $T_{down}$ preferably being a load which is less than 50%, preferably less than 30%, of the maximum load $T_{max, n}$ at the instantaneous engine speed n.

The load thresholds, $T_{down}$ and $T_{up}$ specified for undershooting and overshooting can be of the same magnitude or, alternatively, of different magnitudes. When the internal combustion engine is in operation, the cylinders of the first cylinder group are cylinders that are continuously in operation. It is the second cylinder group which is switched, e.g. said second group is switched on and off.

Versions of the method in which the at least one cylinder of the second group is switched off as soon as the predetermined load $T_{down}$ is undershot and the instantaneous load is lower than said predetermined load $T_{down}$ for a predeterminable time period $\Delta t_1$ may be advantageous.

Introducing an additional condition for the switching off of the cylinders of the second group, e.g. partial shutdown, is intended to prevent excessively frequent switching on and off, in particular partial shutdown when the load undershoots the predetermined load $T_{down}$ briefly and then increases again or fluctuates around the predetermined value for the load $T_{down}$ without the undershoot requiring or justifying partial shutdown.

For these reasons, versions of the method in which the at least one cylinder of the second group is switched on as soon as the predetermined load $T_{up}$ is overshot and the instantaneous load is higher for a predeterminable time period $\Delta t_2$ than said predetermined load $T_{up}$ are likewise advantageous.

Versions of the method in which the fuel supply to the at least one switchable cylinder is deactivated during shutdown may be advantageous. Advantages in respect of fuel consumption and pollutant emissions are obtained, and this promotes the objective pursued with partial shutdown, namely that of reducing fuel consumption and improving efficiency. In the case of auto-ignition internal combustion engines, it may even be necessary to deactivate the fuel supply in order reliably to prevent ignition of the mixture in the cylinder.

Versions of the method in which when switching off the at least one cylinder that can be switched as a function of load, the fuel supply to the at least one switchable cylinder is deactivated first, before the throttling element is actuated, and when switching on the at least one cylinder that has been switched off, the throttling element is actuated first, before the fuel supply to the at least one cylinder that has been switched off is activated may be advantageous.

This procedure may provide stable transient operating behavior of the turbocharger of a pressure-charged internal combustion engine and of the internal combustion engine itself, and takes account of the fact that the fuel supply of the internal combustion engine can be deactivated and reactivated immediately, e.g. with little time delay, whereas the turbocharger responds with a certain time delay in the context of partial shutdown, e.g. when the switchable cylinders are switched off and when the cylinders that have been switched off are switched on again, that is to say it responds with a delay to changes.

Versions of the method in which the at least one cylinder which is in operation is ignited by auto-ignition may be advantageous.

The above version of the method relates to methods in which combustion is initiated by auto-ignition and hence also to operating methods of the kind that are usually employed on diesel engines.

Versions of the method in which each cylinder is fitted with an ignition device for the initiation of applied ignition, wherein the ignition device of the at least one switchable cylinder is preferably deactivated during shutdown, are also advantageous.

The above version of the method relates to the use of the method on an applied-ignition internal combustion engine, e.g. a direct-injection spark-ignition engine, the cylinders of which are each fitted with an ignition device for the initiation of applied ignition.

However, there is also the possibility of employing a hybrid combustion method involving auto-ignition for the operation of a spark-ignition engine, e.g. the "HCCI method" (Homogenous Charge Compression Ignition), also referred to as the CAI method (Controlled Auto-Ignition). This method is based on controlled auto-ignition of the fuel supplied to the cylinder. In this method, as in a diesel engine, the fuel is burned with an excess of air, e.g. under superstoichiometric conditions. Owing to the low combustion temperatures, the spark-ignition engine operated on a lean mixture has comparatively low nitrogen oxide emissions NO and, likewise owing to the lean mixture, has no soot emissions. Moreover, the HCCI method leads to high thermal efficiency. In this arrangement, the fuel can be introduced either directly into the cylinders or into the intake manifold.

Embodiments of the method in which the predeterminable load $T_{down}$ and/or $T_{up}$ is dependent on the speed n of the internal combustion engine may be advantageous. In that case, there is not just one specific load, at the undershooting or overshooting of which switching occurs independently of the engine speed n. On the contrary, the procedure is engine-speed-dependent, and a range in the characteristic map in which partial shutdown is performed is defined.

In principle, other operating parameters of the internal combustion engine can be used as a criterion for partial shutdown, e.g. the engine temperature or the coolant temperature after cold starting of the internal combustion engine.

Versions of the method in which a predeterminable minimum quantity of charge air and no less is fed to the at least one cylinder that has been switched off may be advantageous. Thus, a valve arranged in the intake line of a switchable cylinder is not completely closed during or upon partial shutdown. If a flap is used as a throttling element, there is no harm if this flap has a leakage flow in the closed position.

Embodiments of the method in which the charge air quantity fed to the at least one cylinder that has been switched off is co-determined by the load T, the engine speed n, the coolant temperature, the oil temperature, the engine temperature and/or the like may be advantageous.

In the present disclosure systems and methods are provided for an engine wherein one group of cylinders is active and a second group of cylinders is switchable, such that under low loads the second group of cylinders is deactivated, and under high loads the second group of cylinders is activated. Following switch-off of the second group of cylinders a throttling element in an intake line for the second group of cylinders is gradually closed. The closing of the throttling element may reduce pumping losses and thus increase engine efficiency.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
selectively deactivating fuel injection to inner cylinders of an engine while maintaining combustion in outer cylinders, valves of all cylinders continuing to operate and pump gasses through the engine, and at least partially closing a throttling element coupled only to one deactivated inner cylinder and positioned upstream of an intake valve of the only one deactivated inner cylinder;

during the selective deactivation, adjusting a degree of throttle closure of the throttling element responsive to exhaust pressure and turbine speed of a turbocharger turbine; and also adjusting a turbocharger wastegate based on the degree of throttle closure of the throttling element and a desired boost level.

2. The method of claim 1, further comprising further adjusting the degree of throttle closure of the throttling element based on an exhaust flow rate through the turbocharger turbine, and during the selective deactivation, providing different air amounts to active cylinders than to deactivated cylinders.

3. The method of claim 1, further comprising closing the turbocharger wastegate during the selective deactivation and further adjusting the degree of throttle closure of the throttling element based on the desired boost level.

4. The method of claim 1, wherein the degree of throttle closure of the throttling element is proportional to flow through cylinders maintaining combustion.

5. The method of claim 1, wherein the turbocharger turbine is coupled to both the inner and outer cylinders, wherein the throttling element is not coupled to the outer cylinders, and wherein intake air that flows to the outer cylinders from a turbocharger compressor coupled to the turbocharger turbine does not flow through any throttling element other than respective intake valves and an intake throttle.

6. The method of claim 1, wherein adjusting the degree of throttle closure of the throttling element includes determining a flow and a pressure ratio across the turbocharger turbine and further adjusting the degree of throttle closure of the throttling element responsive to the determined flow and pressure ratio across the turbocharger turbine.

7. The method of claim 1, wherein adjusting the degree of throttle closure of the throttling element includes determining an oxygen content of exhaust gasses and further adjusting the degree of throttle closure of the throttling element responsive to the determined oxygen content.

8. The method of claim 1, wherein adjusting the degree of throttle closure of the throttling element includes determining the exhaust pressure and the turbine speed of the turbocharger turbine and determining the degree of throttle closure of the throttling element based on the determined exhaust pressure and turbine speed.

9. The method of claim 1, wherein adjusting the degree of throttle closure of the throttling element responsive to the exhaust pressure and the turbine speed of the turbocharger turbine comprises determining the degree of closure of the throttling element based on one or more of the exhaust pressure, an exhaust flow rate through the turbocharger turbine, and the turbine speed of the turbocharger turbine, and closing the throttling element to the determined degree.

10. The method of claim 9, wherein closing the throttling element to the determined degree is done gradually after deactivating fuel injection to the inner cylinders, and further comprising, preceding cylinder reactivation, fully opening the throttling element.

11. The method of claim 10, wherein fully opening the throttling element is done gradually before reactivating fuel injection to the inner cylinders.

12. A method, comprising:
responsive to engine load dropping below a first threshold load, selectively deactivating fuel injection to inner cylinders of an engine while maintaining combustion in outer cylinders, intake and exhaust valves of all cylinders continuing to operate and pump gasses through the engine; and during the selectively deactivating:
determining a degree of throttle closure of a throttling element coupled only to one deactivated inner cylinder, upstream of an intake valve of the one deactivated inner cylinder, based on:
an exhaust pressure of a turbocharger turbine and a turbine speed of the turbocharger turbine while a turbocharger wastegate arranged around the turbocharger turbine is adjusted to maintain a desired boost level; and
an exhaust flow rate through the turbocharger turbine, the exhaust pressure of the turbocharger turbine, and the desired boost level, while the turbocharger wastegate is closed; and
adjusting the throttling element to the determined degree of throttle closure.

13. The method of claim 12, wherein the determining the degree of throttle closure of the throttling element is further based on an oxygen content of exhaust gasses, where the determined degree of throttle closure of the throttling element increases as the oxygen content of exhaust gasses increases.

14. The method of claim 12, wherein the throttling element is not coupled to the outer cylinders which are not deactivated and wherein the turbocharger turbine is coupled to both the inner cylinders and the outer cylinders, and further comprising responsive to engine load increasing above a second threshold load, adjusting the degree of throttle closure of the throttling element until the throttling element is fully open and then reactivating fuel injection to the inner cylinders of the engine.

* * * * *